United States Patent [19]
Snowwhite et al.

[11] Patent Number: 6,136,880
[45] Date of Patent: Oct. 24, 2000

[54] RADIATION-CURABLE LIQUID RESIN COMPOSITION FOR COATING OPTICAL FIBERS

[75] Inventors: Paul Eugene Snowwhite, Elgin; Timothy Edward Bishop, Algonquin; David Michael Szum, Elmhurst, all of Ill.; Zen Komiya; Miyuki Ishikawa, both of Tsukuba Ibaraki, Japan; Takashi Ukachi, Ushiku Ibaraki, Japan

[73] Assignees: DSM N.V., Heerlen, Netherlands; JSR Corporation, Tokyo, Japan

[21] Appl. No.: 09/064,173

[22] Filed: Apr. 22, 1998

Related U.S. Application Data

[60] Provisional application No. 60/043,966, Apr. 22, 1997.

[30] Foreign Application Priority Data

May 16, 1997 [JP] Japan .................................. 97-126629
Jul. 18, 1997 [JP] Japan .................................. 97-145939

[51] Int. Cl.$^7$ ..................................................... C08F 2/46
[52] U.S. Cl. ................................ 522/64; 522/38; 522/96; 428/378; 428/380; 428/383
[58] Field of Search ................................ 522/64, 38, 96; 428/378, 380, 383

[56] References Cited

U.S. PATENT DOCUMENTS

| | | | |
|---|---|---|---|
| 4,737,593 | 4/1988 | Ellrich et al. ........................ | 568/15 |
| 4,792,632 | 12/1988 | Ellrich et al. . | |
| 5,336,563 | 8/1994 | Coady et al. ........................ | 428/375 |
| 5,534,559 | 7/1996 | Leppard et al. ..................... | 522/64 |
| 5,744,514 | 4/1998 | Shustack ............................. | 522/42 |
| 5,767,169 | 6/1998 | Leppard et al. . | |

FOREIGN PATENT DOCUMENTS

| | | |
|---|---|---|
| 184 095 | 6/1986 | European Pat. Off. . |
| 615 980 A2 | 9/1994 | European Pat. Off. . |
| 195 32 358 A1 | 3/1996 | Germany . |
| 2 310 855 | 9/1997 | United Kingdom . |

*Primary Examiner*—James J. Seidleck
*Assistant Examiner*—Sanza McClendon
*Attorney, Agent, or Firm*—Pillsbury Madison & Sutro

[57] ABSTRACT

A radiation-curable composition for optical fiber coatings comprising about 10 wt. % to about 90 wt. % of at least one radiation-curable oligomer (A), about 10 wt. % to about 90 wt. % of at least one radiation-curable monomer diluent (B), and an effective amount of at least one photoinitiator (C) represented by formula (1):

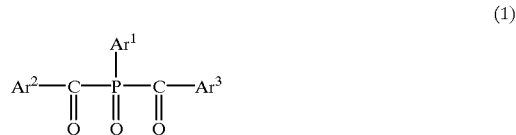

(1)

wherein $Ar^1$ to $Ar^3$ are aromatic groups which may have one or more substitution groups.

16 Claims, 1 Drawing Sheet

RADIATION-CURABLE LIQUID RESIN COMPOSITION FOR COATING OPTICAL FIBERS

This application is a related application of U.S. provisional application 60/43966 filed Apr. 22, 1997, Japanese patent JP 97-126629 filed May 16, 1997, and Japanese patent JP 97-145939 filed Jul. 18, 1997, the complete disclosures of which are fully incorporated herein by reference.

FIELD OF THE INVENTION

The present invention relates to a radiation-curable liquid resin composition for coating and cabling optical fibers, which compositions exhibit superior curing and a reduced amount of particulate matter, for example crystalline inclusions, and produce cured products which exhibit minimum yellowing, exhibit excellent durability. Hence, the liquid curable resin composition which is particularly suitable for use as a coating material coated on optical fibers or optical fiber ribbon matrices. Furthermore, the resin composition when cured can have stable adhesion, and can be easily removed from the material on which the composition has been coated. Therefore, the composition is particularly suitable for use as a soft coating coated on optical fibers.

DESCRIPTION OF THE RELATED ART

Radiation-curable compositions are extensively used in the optical fiber industry during the production of optical fibers, ribbons, and cables. For example, optical glass fibers are routinely coated with at least one radiation-curable coating (often two coatings) immediately after the glass fiber is manufactured in a draw tower so as to preserve the pristine character of the glass fiber. Immediately after a coating is applied to the fiber, the coating is rapidly cured by exposure to radiation (commonly ultraviolet light). The industry demands faster production speeds, and therefore, faster curing coating compositions.

Radiation-curable matrix and bundling materials can further support and protect the individual strands of coated fiber as individual strands are bundled together into optical fiber ribbons, optical fiber cables, and associated structures. Also, radiation-curable inks can be used to color code individual strands of optical fiber. All of these types of optical fiber-related materials are preferably radiation-curable and can serve as coating and/or cabling materials.

Two radiation-curable coating layers are routinely employed in optical fiber production before ribboning and cabling. One layer is a soft inner primary coating ("primary coating"), which directly contacts the glass fiber and prevents microbending. The other layer is a tougher outer primary coating ("secondary coating"), which provides a more durable exterior for the glass fiber.

Examples of radiation-curable primary coatings are disclosed in U.S. Pat. No. 5,336,563 to Coady et al and secondary coatings in U.S. Pat. No. 4,472,019. Additional aspects of optical fiber coating technology are disclosed in, for example, U.S. Pat. Nos. 5,595,820 to Szum, 5,199,098 to Nolan et al.; 4,923,915 to Urruti et al.; 4,720,529 to Kimura et al.; and 4,474,830 to Taylor et al.

Along with expanding installation of optical fiber cables in recent years causing optical fibers to be exposed under various environmental conditions, higher durability is demanded of soft coatings, hard coatings, coloring materials, and bundling materials for optical fibers. Particularly, a resin used as a soft coating must exhibit stable adhesion to glass over an extended period of time. In addition, expanded use of the optical fiber ribbon structure consisting of a plurality of optical fibers requires improvement in the operation for splicing optical fibers. Specifically, it is strongly desired that all materials in optical fiber ribbons such as soft coatings, hard coatings, coloring materials, ribbon matrixes, and bundling materials be removed in one operation from optical fiber glass. Furthermore, as the demand for optical fibers increases, improvement in the productivity of optical fibers is desired. Specifically, it is strongly desired that the materials have characteristics whereby they may be coated onto glass fibers and cured quickly to constantly produce a coat with an even thickness.

To maximize cure speed in an ultraviolet light cure, at least one photoinitiator is required (photoinitiator may be omitted in an electron beam cure). Several photoinitiators can be used to achieve a suitable balance of surface and through cure. Conventional classes of photoinitiators have been used. Mono-acyl phosphine oxide type photoinitiators can be used such as Lucirin TPO [(2,4,6-trimethylbenzoyl) diphenyl phosphine oxide [commercially available from BASF] which exhibits relatively fast cure speed. However, use of commercial Lucirin TPO can cause undesired crystallization effects in the coatings (e.g., during aging), which can result in inclusions and loss of optical clarity (detected under a light microscope). Attempts have been made to use purified Lucirin TPO, but the purification steps are costly. Other phosphine oxide photoinitiators (e.g., CGI 403, Ciba) can show reduced amounts of harmful crystallization effect, but they may also have slower cure speed. Hence, a need exists to discover photoinitiators which can provide both fast cure speed and good optical clarity. The art, until now, has not provided direction on how to achieve such properties.

In addition, photoinitiators can cause yellowing, particularly during long term aging of cured compositions under photolytic aging conditions (e.g., UV or fluorescent light). Heat may also induce yellowing. Discoloration in general and yellowing in particular is undesired and has become anathema in the industry. Hence, a photoinitiator which would provide for lack of harmful crystalline effects and fast cure, but would result in yellowing, would not sufficiently meet the most stringent industry demands.

The art has not recognized a photoinitiator which provides an excellent balance of these properties. For example, a very large number of phosphine oxide photoinitiators are disclosed in, for example, U.S. Pat. Nos. 5,218,009 to Rutsch et al. and 5,534,559 to Leppard et al. However, these patents do not suggest that any particular species of photoinitiators would solve the above-noted problems and provide an excellent balance of properties. Hence, they do not anticipate or suggest the present invention.

PROBLEMS TO BE SOLVED BY THE INVENTION

The characteristics required for radiation curable resins used as the coating materials for optical fibers include: being a liquid at ordinary temperatures and having a sufficiently low viscosity to be excellently coated; providing good productivity at a high curing rate; having sufficient strength and superior flexibility; exhibiting very little physical change during temperature changes over a wide range; having superior heat resistance and superior resistance to hydrolysis; showing superior long term reliability with little physical changes over time; showing superior resistance to chemicals such as acids and alkalis; exhibiting low moisture and water absorption; exhibiting superior light resistance showing the least discoloration over time; exhibiting high resistance to oils; and producing little hydrogen gas which adversely affects optical fiber characteristics.

High durability and productivity are required for optical fiber along with expanding installation of optical fiber cables in recent years. Specifically, if the durability of a coating material for optical fiber is low and, for example, coloring is conspicuous, the visibility of a color painted for distinguishing optical fiber decreases, exhibiting a problem that the maintenance of the cable is hindered. It has been already confirmed that the reduction of visibility is caused not only by coloring of the bundling material, but also by coloring of the hard coating or the soft coating.

Moreover, an increased demand of optical fibers makes it necessary for the coating materials to cure quickly in a stable manner. A photo-initiator which decomposes fast must be used for the coating materials to cure quickly.

Furthermore, the resin used as the soft coating must exhibit stable adhesion to glass over a long period of time. In addition, when all coating materials are removed from the ribbon structure of optical fibers, there should be no residue remaining on the glass.

Japanese Patent Application Laid-open No. 190712/1989 discloses a composition comprising an acyl phosphine oxide as a photo-curable resin composition which realizes high productivity in fast curing. However, this composition is not necessarily cured at a high enough rate to sufficiently increase the productivity of optical fibers while maintaining the characteristics required for an optical fiber coating material.

Another composition comprising a bis-acyl phosphine oxide has been proposed in Japanese Patent Application Laid-open No. 259642/1996 as a photo-curable resin composition which shows high productivity by being cured at a high rate. However, the bis-acyl phosphine oxide containing a long chain aliphatic group disclosed in this Japanese Patent Application has a poor solubility in resin compositions, and hence cannot be dissolved in the resin compositions in an amount sufficient to ensure a high cure rate.

A decrease in adhesion strength between an optical fiber coating material and optical glass fiber over time is known to induce deterioration in the low attenuation of light signal characteristics of the optical fiber. Although various means have been proposed to stabilize the adhesion strength, none has exhibited a sufficient effect. For example, a method for increasing the adhesion strength of a resin composition to glass under high humidity and high temperature conditions by incorporating an organic functional silane additive is disclosed in Japanese Patent Application Laid-open No. 21546/1992. This method is known to achieve the intended objective only insufficiently because the organic functional silane compound decreases the curing speed of the coating material itself and, hence, can be added in only a limited amount.

The importance of the process for removing all coating materials in ribbon structure optical fibers in one operation is increasing in recent years. In this regard, Ching-Kee Chien et al. reported that the capability of removing all coating materials in one operation largely depends on the temperature when the coating materials are removed and the removal speed (Proceedings of 45th International Wire and Cable Symposium p 554 (1996)). The detailed mechanism is not known at the present time. In addition, no proposal for improving these problems from the aspect of coating material has surfaced up to the present time.

What is needed in the optical fiber art, but what the art seemingly has not yet provided, is a radiation-curable composition which provides fast cure speed, and which, upon cure provides good optical clarity, and minimal discoloration and yellowing. Without this combination of properties, the composition is not meeting the stringent industry demands.

SUMMARY OF THE INVENTION

An object of the present invention is therefore to provide a radiation-curable liquid resin composition for coating optical fibers exhibiting superior curing and producing cured products which encounter yellowing only to the least extent and exhibit excellent durability. A further object of the invention is to provide a radiation-curable liquid resin composition which, after being cured, can be easily removed from the material on which the composition has been coated.

The present invention provides a radiation-curable composition for optical fiber coatings comprising about 10 wt. % to about 90 wt. % of at least one radiation-curable oligomer (A), about 10 wt. % to about 90 wt. % of at least one radiation-curable monomer diluent (B), and an effective amount of at least one photoinitiator (C) represented by formula (1):

wherein $Ar^1$ to $Ar^3$ independently represent unsubstituted and/or substituted aromatic groups, said substituted groups may include among other groups hetero groups comprising O, S and/or N.

The invention further provides covering layers for optical fibers such as radiation-curable inner primary coatings, outer primary coatings, matrix materials, bundling materials, inks, and other types of materials employed in optical fiber technology which comprise the photoinitiator represented by formula (1).

The present invention further provides a light transmitting device comprising an optical fiber preferably an optical glass fiber, and at least one radiation-cured covering layer thereon, wherein the covering layer, before radiation cure, is a radiation-curable composition comprising about 10 wt. % to about 90 wt. % of at least one radiation-curable oligomer, about 10 wt. % to about 90 wt. % of at least one radiation-curable monomer diluent, and an effective amount of at least one photoinitiator represented by formula (1).

The invention further provides a method of making coated optical fibers comprising coating an optical fiber with a radiation-curable composition comprising about 10 wt. % to about 90 wt. % of at least one radiation-curable oligomer, about 10 wt. % to about 90 wt. % of at least one radiation-curable monomer diluent, and an effective amount of at least one photoinitiator represented by formula (1).

The present invention further provides a method of cabling coated optical fibers with a radiation-curable composition comprising about 10 wt. % to about 90 wt. % of at least one radiation-curable oligomer, about 10 wt. % to about 90 wt. % of at least one radiation-curable monomer diluent, and an effective amount of at least one photoinitiator represented by formula (1).

The invention further provides a method for improving the clarity by reducing the amount of particulate matter in a radiation-cured optical fiber coating comprising the step of formulating a radiation-curable composition consisting essentially of about 10 wt. % to about 90 wt. % of at least one radiation-curable oligomer, about 10 wt. % to about 90 wt. % of at least one radiation-curable monomer diluent, and an effective amount of at least one photoinitiator represented by formula (1). Coating ingredients should be excluded from the composition which, upon cure, cause crystalline inclusions. Preferably, Lucirin TPO photoinitiator should be used minimally (for example, less than about 0.1 wt. %) or not at all.

Radiation-curable liquid resin composition which are used preferably for inner primary coatings of glass optical fibers comprise (a) 40–95% by weight of a polyurethane containing a polyoxyalkylene structure comprising at least one oxyalkylene group having 2–10 carbon atoms and an ethylenically unsaturated group, (b) 3–50% by weight of a mono-functional (meth)acrylate of which the homopolymer has a glass transition temperature of less than 20° C., and (c) 0.05–10% by weight of a photo-initiator which is a compound having a chemical structure with the following formula (1), as defined above.

DETAILED DESCRIPTION OF THE INVENTION

The radiation-curable compositions can be formulated to be coatings for optical fibers. "Coating" herein—unless otherwise specified—refers to inner primary, outer primary, and single coatings; matrix materials, inks (for application to coated optical fibers) and cabling (bundling) materials. Compositions can comprise at least one radiation-curable oligomer, at least one radiation-curable monomer diluent, at least one photoinitiator as represented by formula 1, and additives.

The radiation-curable oligomer may be any radiation-curable oligomer used in a radiation-curable, optical fiber coating compositions. An example of a suitable radiation-curable oligomer includes an urethane oligomer having a molecular weight of at least about 500 and containing at least one ethylenically unsaturated group. For example, if the diluent is present in the coating composition, the ethylenically unsaturated group can be the reactive terminus of the oligomer to which the reactive diluent binds to when the composition is cured. Preferably, the oligomer has two terminal radiation-curable functional groups.

Representative inner primary coatings and oligomers are disclosed in, for example, U.S. Pat. Nos. 5,336,563 and 4,992,524, which are incorporated by reference. Representative outer primary coatings and oligomers are disclosed in, for example, U.S. Pat. No. 4,472,019, which is incorporated by reference. Representative single coatings and oligomers are disclosed in, for example, U.S. Pat. No. 4,932,750, which is incorporated by reference. Other coating compositions are disclosed in, for example, U.S. Pat. Nos. 5,527,835 and 5,146,531, which are hereby incorporated by reference.

Preferably, the number average molecular weight of the oligomer is at least about 700 and at most about 10,000 Daltons. More preferably, the molecular weight is between about 1,000 and about 8,000, and most preferably, between about 1,000 and 6,000 Daltons.

Preferably, the oligomer is substantially free of isocyanate functionality.

The radiation-curable oligomer is preferably present in an amount of about 10 to about 90% by weight, and more preferably, about 20 to about 90% by weight.

Examples of suitable radiation-curable functional groups which can be present on the oligomer include ethylenically unsaturated groups having (meth)acrylate, vinylether, acrylamide, maleate or fumarate functionality. The language "(meth)acrylate" as used herein, means methacrylate, acrylate, or mixtures thereof.

Preferably, the radiation-curable group in the oligomer is a (meth)acrylate or vinylether group. Most preferably, the radiation-curable group is an acrylate group.

Preferably, the oligomer contains at least two ethylenically unsaturated groups which are bound to an oligomer backbone. For example, ethylenically unsaturated groups can be present at each end of the oligomer backbone as reactive termini. The oligomer backbone can be, for example, based on a polyether, polyolefin, polyester, polycarbonate, or copolymers thereof. Preferably, the oligomer backbone comprises polyether, polycarbonate, polyolefin, or mixtures thereof. When the oligomer backbone is prepared with use of a pre-polymer, which is converted to a radiation-curable oligomer by methods known in the art, then the molecular weight of the polyol prepolymer is preferably at least about 250, more preferably at least about 400, and most preferably at least about 600. The molecular weight is preferably not more than about 10,000, more preferably not more than about 5,000, and most preferably not more than about 3,000. The term "oligomer polyol" is used as well to denote "polyol prepolymer".

The oligomer backbone can comprise one or more oligomeric blocks coupled with each other via, for example, urethane linkages. For example, one or more types of polyol prepolymers can be linked by methods known in the art, and as are described below.

If the oligomer backbone is a polyether, the resulting coatings can have a low glass transition temperature and good mechanical properties. If the oligomer backbone is a polyolefin, the resulting coatings can have a further improved water resistance. Polycarbonate-based oligomers can provide for good stability.

Oligomer can be, for example, prepared by reaction of (i) an oligomer polyol, (ii) a di- or polyisocyanate and (iii) a hydroxy functional ethylenically unsaturated monomer such as, for example hydroxyalkyl(meth)acrylate.

If an oligomer backbone polyol is used, preferably it has on average at least about 2 hydroxyl groups. The oligomer backbone polyol may have, on average, more than 2 hydroxyl groups. Examples of such an oligomer diol include polyether diols, polyolefin diols, polyester diols, polycarbonate diols, and mixtures thereof. Polyether and polyolefin diols, or combinations thereof, are preferred.

Urethane (meth)acrylate, which is component (A), can be produced by reacting a polyol (i), diisocyanate (ii), and (meth)acrylate containing a hydroxyl group (iii). Specifically, component (A) is produced by reacting an isocyanate group of the diisocyanate with the hydroxyl groups of the polyol and a second isocyanate group with the hydroxy group of the (meth)acrylate.

The methods of the reaction include a method in which the polyol, diisocyanate, and (meth)acrylate containing a hydroxyl group are reacted by a batch-process; a method in which polyol is first reacted with diisocyanate and then the reactant is reacted with (meth)acrylate; a method in which diisocyanate is first reacted with (meth)acrylate containing a hydroxyl group and then the reactant is reacted with polyol; a method in which diisocyanate is first reacted with (meth) acrylate containing a hydroxyl group, then the reactant is reacted with polyol, and finally the resulting reactant is reacted with (meth)acrylate containing a hydroxyl group; and the like.

The polyurethane used as component (A) in a preferred embodiment of the present invention, can be obtained by reacting a diol compound having a polyoxyalkylene structure formed from an oxyalkylene group containing 2–10 carbon atoms, a diisocyanate compound, and a compound having an ethylenically unsaturated group.

Examples of suitable diol compounds having a specific polyoxyalkylene structure used in the above-mentioned processes include polyethylene glycol, polypropylene glycol, polytetramethylene glycol, polyhexamethylene glycol, and polyether diols obtained by the ring-opening copolymerization of one or more ion-polymerizable cyclic compounds. Examples of the ion-polymerizable cyclic compounds include cyclic ethers such as ethylene oxide, propylene oxide, butene-1-oxide, isobutene oxide, tetrahydrofuran, 2-methyl tetrahydrofuran, 3-methyl tetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and benzoic acid glycidyl ester. Polyether diols obtained by the ring-opening copolymerization of one of the above-mentioned ion-polymerizable cyclic compounds and a cyclic imine such as ethyleneimine, β-propyolactone, a cyclic lactone acid such as glycolic acid lactide, or a dimethylcyclopolysiloxane, can also be used. Here, specific combinations of two or more ion-polymerizable cyclic compounds include a binary copolymer, such as a copolymer of tetrahydrofuran and propylene oxide, copolymer of tetrahydrofuran and 2-methyl tetrahydrofuran, copolymer of tetrahydrofuran and 3-methyl tetrahydrofuran, copolymer of tetrahydrofuran and ethylene oxide, copolymer of propylene oxide and ethylene oxide, copolymer of butene-1-oxide and ethylene oxide, and copolymer of butene-1-oxide and propylene oxide, and a ternary copolymer such as a copolymer of tetrahydrofuran, butene-1-oxide, and ethylene oxide. These ring-opening copolymers may be either a random copolymer or a block copolymer of these ion-polymerizable cyclic compounds.

If a polyether diol is used, preferably the polyether is a substantially non-crystalline polyether.

An example of a polyether polyol that can be used is the polymerization product of 20 percent by weight of 3-methyltetrahydrofuran and 80 percent by weight of tetrahydrofuran, both of which have undergone a ring opening polymerization. This polyether copolymer contains both branched and non-branched oxyalkylene repeating units and is marketed as PTGL 1000 (Hodogaya Chemical Company of Japan). Another example of a polyether in this series which can be used is PTGL 2000 (Hodogaya Chemical Company).

Other diol compounds containing the polyoxyalkylene structure may be commercially available under the trademarks of PTMG1000, PTMG2000 (manufactured by Mitsubishi Chemical Corp.), PPG1000, EXCENOL2020, 1020 (manufactured by Asahi Oline Co., Ltd.), PEG1000, Unisafe DC1100, DC1800 (manufactured by Nippon oil and Fats Co., Ltd.), PPTG2000, PPTG1000, PTG400 (manufactured by Hodogaya Chemical Co., Ltd.), and Z-3001-4, Z-3001-5, PBG2000A, PBG2000B (manufactured by Daiichi Kogyo Seiyaku Co., Ltd.).

The above polyether diols are preferred diols, however, polyester diol, polycarbonate diol, polycaprolactone diol, polyolefin diol or the like may be used alone or in combination with polyether diols. There are no limitations to the type of polymerization of structural units. The polymerization may be any of random polymerization, block polymerization, and graft polymerization.

Examples of the polyester diol compounds include polyester diols obtained by the reaction of a polyhydric alcohol, such as ethylene glycol, diethylene glycol, polyethylene glycol, propylene glycol, polypropylene glycol, tetramethylene glycol, polytetramethylene glycol, 1,6-hexanediol, neopentyl glycol, 1,4-cyclohexanedimethanol, 3-methyl-1,5-pentane diol, 1,8-octane diol, 1,9-nonane diol, or 2-methyl-1,8-octane diol; with a polybasic acid such as phthalic acid, isophthalic acid, terephthalic acid, maleic acid, fumaric acid, adipic acid, sebasic acid, trimellitic acid, tetrahydrophthalic acid, hexahydrophthalic acid, tetrachlorophthalic acid, azelaic acid, succinic acid, glutaric acid, malonic acid, pimelic acid, suberic acid, 2,2-dimethylsuccinic acid, 3,3-dimethylglutaric acid, 2,2-dimethylglutaric acid, the like, anhydrides thereof and mixtures thereof. These polyester diol compounds are commercially available under the trademarks, for example, of KURAPOL P-2010, PMIPA, PKA-A, PKA-A2, or PNA-2000 (manufactured by Kuraray Co., Ltd.).

Included in the class of polyester polyols are polycaprolactone diol compounds, polycaprolactone diols obtained by the reaction of ε-caprolactone and a divalent diol, such as ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexanedimethanol, or 1,4-butanediol, and commercially available products, such as PLACCEL 205, 205AL, 212, 212AL, 220, 220AL (manufactured by Daicel Chemical Industries, Ltd.), are given. Other polycaprolactones are commercially available from Union Carbide under the trade designation TONE POLYLOL series of products, for example, TONE 0200, 0221, 0301, 0310, 2201, and 2221. TONE POLYOL 0301 and 0310 are trifunctional.

If a polyolefin diol is used, the polyolefin is preferably a linear or branched hydrocarbon containing a plurality of hydroxyl end groups. Preferably, the hydrocarbon is a non-aromatic compound containing a majority of methylene groups (—$CH_2$—) and which can contain internal unsaturation and/or pendent unsaturation. Fully saturated, for example, hydrogenated hydrocarbons, are preferred because the long term stability of the cured optical fiber coating increases as the degree of unsaturation decreases. Examples of polyolefin diols include, for example, hydroxyl-terminated, fully or partially hydrogenated 1,2-polybutadiene; 1,4-1,2-polybutadiene copolymers, 1,2-polybutadiene-ethylene or -propylene copolymers, polyisobutylene polyol; mixtures thereof, and the like. Preferably, the hydrocarbon diol is a substantially, fully hydrogenated 1,2-polybutadiene or 1,2-polybutadiene-ethene copolymer.

Examples of polycarbonate diols include those conventionally produced by the alcoholysis of diethylene carbonate with a diol. The diol can be, for example, an alkylene diol having about 2 to about 12 carbon atoms, such as, 1,4-butane diol, 1,6-hexane diol, 1,12-dodecane diol, and the like. Mixtures of these diols can also be utilized. The polycarbonate diol can contain ether linkages in the backbone in addition to carbonate groups. Thus, for example, polycarbonate copolymers of alkylene oxide monomers and the previously described alkylene diols can be used. Alkylene oxide monomers include, for example, ethylene oxide, tetrahydrofuran, and the like. These copolymers produce cured coatings that exhibit a lower modulus and also inhibit crystallinity of the liquid coating composition compared to polycarbonate diol homopolymers. Admixtures of the polycarbonate diols and polycarbonate copolymers can also be utilized.

Polycarbonate diols include, for example, DURACARB 122 (PPG Industries) and PERMANOL KM10-1733 (Permuthane, Inc., Massachusetts). DURACARB 122 is produced by the alcoholysis of diethylcarbonate with hexane diol. Other suitable commercially available products exist, such as DN-980, 981, 982, 983 manufactured by Nippon Polyurethane Industry Co., Ltd.), PC-8000 (manufactured by PPG of the US), PC-THF-CD (manufactured by BASF).

Diol compounds other than those mentioned above can also be used in amounts in which the effects of the present invention are not affected. Such other diol compounds include, for example, ethylene-glycol, propylene glycol, 1,4-butanediol, 1,5-pentanediol, 1,6-hexanediol, neopentyl glycol, 1,4-cyclohexanedimethanol, an ethylene oxide addition diol of bisphenol A, propylene oxide addition diol of bisphenol A, butylene oxide addition diol of bisphenol A, ethylene oxide addition diol of bisphenol F, propylene oxide addition diol of bisphenol F, butylene oxide addition diol of bisphenol F, ethylene oxide addition diol of hydrogenated bisphenol A, propylene oxide addition diol of hydrogenated bisphenal A, butylene oxide addition diol of hydrogenated bisphenol A, ethylene oxide addition diol of hydrogenated bisphenol F, propylene oxide addition diol of hydrogenated bisphenol F, butylene oxide addition diol of hydrogenated bisphenol F, alkylene oxide addition diol of hydroquinone, alkylene oxide addition diol of naphthohydroquinone, alkylene oxide addition diol of anthrahydroquinone, 1,4-cyclohexane diol and its alkylene oxide addition diol, pentacyclopentadecane diol, pentacyclopentadecanedimethanol, dimethylol compound of dicyclopentadiene, tricyclodecanedimethanol, β-methyl-δ-valerolactone, hydroxy terminal polybutadiene, hydroxy terminal hydrogenated polybutadiene, castor oil modified polyol, terminal diol compound of polydimethylsiloxane, and polydimethylsiloxane carbitol modified polyol.

Among these, alkylene oxide addition diol of bisphenol A and tricyclodecane dimethanol are desirable. These polyols are available as commercial compounds under the trade names of UNIOL DA400, DA700, DA1000, DB400 (manufactured by Nippon Oil and Fats Co., Ltd.) and tricyclodecane dimethanol (manufactured by Mitsubishi Chemical Corp.).

Other than the above-mentioned diols, diamine may be used in combination with diol having a polyoxyalkylene structure. However, it is preferred to use no amines. Examples of such an amine include diamine such as ethylenediamine, tetramethylenediamine, hexamethylenediamine, paraphenylenediamine, 4,4'-diaminodiphenylmethane, and the like, diamine containing a heteroatom, polyether diamine, and the like.

The number average molecular weight of these diol compounds is usually 50–15,000, and preferably 100–8,000.

Any organic polyisocyanate (ii), alone or in admixture, can be used as the polyisocyanate. Thereby, a product is obtained which is end-capped with the reaction product from the isocyanate/ethylenically unsaturated monomer reaction on at least one end of the molecule. "End-capped" means that a functional group caps one of the two ends of the oligomer diol.

The isocyanate/hydroxy functional monomer reaction product attaches to the oligomer backbone (i) diol via a urethane linkage.

Examples of the diisocyanate compounds include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)isocyanate, 2,2,4-trimethylhexamethylene diisocyanate, bis(2-isocyanate-ethyl) fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, 2,5-bis(isocyanatemethyl)-bicyclo[2.2.1] heptane, and 2,6-bis(isocyanatemethyl)-bicyclo[2.2.1] heptane. Among these diisocyanates, 2,4-tolylene diisocyanate, isophorone diisocyanate, xylylene diisocyanate, and methylenebis(4-cyclohexylisocyanate) are particularly preferred. In order to minimize yellowing wholly aliphtic isocyanates are most preferred.

Generally the compound providing a reactive terminus (iii) contains a functional group which can polymerize under the influence of actinic radiation, and the compound contains a functional group which can react with the diisocyanate. Hydroxy functional ethylenically unsaturated monomers are preferred. More preferably, the hydroxy functional ethylenically unsaturated monomer contains acrylate, (meth)acrylate, vinyl ether, maleate or fumarate functionality.

Examples of compounds having an ethylenically unsaturated group, include preferably (meth)acrylic compounds having a hydroxyl group, acid halide group, or epoxy group.

Examples of the (meth)acrylate having a hydroxyl group used in the present invention include 2-hydroxyethyl (meth) acrylate, 2-hydroxypropyl (meth)acrylate, 2-hydroxybutyl (meth)acrylate, 2-hydroxy-3-phenoxypropyl (meth)acrylate, 1,4-butanediol mono(meth)acrylate, 2-hydroxyalkyl(meth) acryloyl phosphate, 4-hydroxycyclohexyl (meth)acrylate, 1,6-hexanediol mono(meth)acrylate, neopentyl glycol mono (meth)acrylate, trimethylolpropane di(meth)acrylate, trimethylolethane di(meth)acrylate, pentaerythritol tri(meth) acrylate, dipentaerythritol penta(meth)acrylate, (meth) acrylates represented by the following structural formulas (2) or (3), (2)

(3)

wherein $R^1$ is a hydrogen atom or a methyl group and n denotes an integer from 1–15. In addition, compounds obtained by an addition reaction between a compound containing a glycidyl group, such as alkyl glycidyl ether, allyl glycidyl ether, or glycidyl (meth)acrylate, and (meth) acrylic acid can also be used. Among these (meth)acrylates having a hydroxyl group, particularly desirable are 2-hydroxyethyl acrylate and 2-hydroxypropyl acrylate.

Glycidyl esters of (meth)acrylic acid are given as the (meth)acrylic compounds having an epoxy group.

As the (meth)acrylic compounds having an acid halide group, (meth)acrylic acid halides such as (meth)acrylic acid chloride and (meth)acrylic acid bromide are given. These compounds having an ethylenically unsaturated group may be used either individually or in combinations of two or more.

Monomers having vinyl ether functional groups include, for example, 4-hydroxybutyl vinyl ether, and triethylene glycol monovinyl ether. Monomers having maleate functional groups include, for example, maleic acid and hydroxy functional maleates.

It is possible to replace a part of the compound having an ethylenically unsaturated group with another type of compound having functional group which can add to an isocyanate group. In particular if the coating composition is to be used for a primary coating, such a compound may be γ-mercaptotrimethoxysilane, γ-aminotrimethoxysilane, and the like. Adhesion properties to substrates such as glass can be improved by using these compounds.

In the reaction between hydroxy group of (i) and isocyanate groups of (ii), it is preferred to employ a stoichiometric balance between hydroxy and isocyanate functionality and to maintain the reaction temperature of at least 25° C. The hydroxy functionality should be substantially consumed.

The proportions of the polyol, diisocyanate, and (meth) acrylate containing a hydroxyl group are preferably designed so that the isocyanate group contained in the diisocyanate and the hydroxyl group contained in the (meth) acrylate containing hydroxyl group are from 1.1 to 3 equivalents (preferably 1,2–3 and most preferred 2–1.5) and from 0.2 to 1.5 equivalents, respectively, to one equivalent of hydroxyl group contained in the polyol. It is particularly preferable that the equivalent of hydroxyl groups in the polyol and acrylate is almost the same as the equivalent of the isocyanate group in diisocyanate.

When the diol compound, diisocyanate compound, and compound having an ethylenically unsaturated group are reacted, is desirable to use a urethanization catalyst, such as copper naphthenate, cobalt naphthenate, zinc naphthenate, dibutyl tin dilaurate, triethylamine, 1,4-diazabicyclo[2.2.2] octane, or 2,6,7-trimethyl-1,4-diazabicyclo[2.2.2]octane, in the amount of 0.01–1 part by weight for 100 parts by weight of the total reaction products. A reaction temperature in the range of 10–90° C., preferably 30–80° C., is employed.

Urethane (meth)acrylate, which is the component (A), prepared in this manner is—as described above—preferably compounded in an amount of from 10 to 90 wt. % in the total components of the composition. It is most preferable that urethane (meth)acrylate be added in an amount of from 20 to 70 wt. % to maintain the applicability when it is applied to optical fiber glass or the like and to maintain the softness and long-term reliability of the coating material after it is cured.

The proportion of the polyurethane (a) in a preferred composition for primary coatings should be in the range of 40–95 wt %, and preferably 45–85 wt %. If this proportion of the polyurethane (a) is less than 45 wt %, the composition produces cured products with so high a Young's modulus at low temperature that flexibility of the coating material may become too low; if more than 95 wt %, coatability on glass fibers may be hampered.

Urethane (meth)acrylate prepared by reacting 2 mols of (meth)acrylate containing a hydroxyl group with 1 mol of diisocyanate may also be added to the liquid curable resin composition of the present invention. Examples of such a urethane (meth)acrylate include a reaction product of hydroxyethyl (meth)acrylate and 2,5-bis(isocyanate methyl) bicyclo[2.2.1]heptane, a reaction product of hydroxyethyl (meth)acrylate and 2,6-bis(isocyanate methyl)-bicyclo [2.2.1]heptane, a reaction product of hydroxyethyl (meth) acrylate and 2,4-tolylene diisocyanate, a reaction product of hydroxyethyl (meth)acrylate and isophorone diisocyanate, a reaction product of hydroxypropyl (meth)acrylate and 2,4-tolylene diisocyanate, a reaction product of hydropropyl (meth)acrylate and isophorone diisocyanate, and the like.

The composition according to the invention may comprise at least one reactive diluent (B). The reactive diluent can be used to adjust the viscosity of the coating composition. Thus, the reactive diluent can be a low viscosity monomer containing at least one functional group capable of polymerization when exposed to actinic radiation.

The reactive diluent is preferably added in such an amount that the viscosity of the coating composition is in the range of about 1,000 to about 10,000 mPas. Suitable amounts of the reactive diluent have been found to be about 10 wt % to about 90 wt %, and preferably about 10 wt. % to about 80% by weight.

The reactive diluent preferably has a molecular weight of not more than about 550 or a viscosity at room temperature of not more than about 300 mPa.s (measured as 100% diluent).

The radiation-curable functional group present on the reactive diluent may be of the same nature as that used in the radiation-curable oligomer. Preferably, the radiation-curable functional group present in the reactive diluent is capable of copolymerizing with the radiation-curable functional group present on the radiation-curable oligomer.

Preferably, the reactive diluent system comprises a monomer or monomers having an acrylate or vinyl ether functionality and an $C_4$–$C_{20}$ alkyl or polyether moiety.

For primary coatings, it is preferred to use a (meth) acrylate of which the homopolymer has a glass transition temperature of 20° C. or less as component (B) in the composition of the present invention. Examples of these include p-cumylphenol EO-modified (1.2 mol modified) acrylate, 2-hydroxy-3-phenoxypropyl(2-acryloyl ethyl) fumarate, 2-hydroxy-3-butyloxypropyl acrylate, 2-hydroxy-3-(2-ethylhexyloxy)propyl acrylate, 2-hydroxy-3-phenoxypropyl acrylate, nonylphenol EO modified (8 mol modified) acrylate, nonylphenol EO modified (1 mol modified) acrylate, nonylphenol EO modified (4 mol modified) acrylate, cyclohexyl acrylate, lauryl acrylate, 2-hydroxyethyl acrylate, dicyclopentenyloxyethyl acrylate, benzyl acrylate, 2-cyanoethyl acrylate, nonylphenol PO modified (2.5 mol modified) acrylate, iso-stearyl acrylate, 2-hydroxypropyl acrylate, phenol EO modified (2 mol modified) acrylate, phenol EO modified (4 mol modified) acrylate, trifluoroethyl acrylate, tetrahydrofurfuryl acrylate, 2-phenoxyethyl acrylate, isobutyl acrylate, amino acrylate, 2-acryloyloxyethyl succinic acid, iso-octyl acrylate, methoxytriethylene glycol acrylate, iso-decyl acrylate, iso-myristyl acrylate, 3-methoxybutyl acrylate, n-hexyl acrylate, triethylene oxide dodecyl ether acrylate, 2-ethylhexylcarbitol acrylate, ethylcarbitol acrylate, ethoxy-diethylene glycol acrylate, methoxytripropylene glycol acrylate, tridecyl acrylate, 4-hydroxybutyl acrylate, isoamyl acrylate, iso-octyl acrylate, 2-methoxyethyl acrylate, 2-ethoxyethyl acrylate, n-butyl methacrylate, n-lauryl methacrylate, dimethylaminoethyl methacrylate, diethylaminoethyl methacrylate, 2-ethylhexyl methacrylate, iso-decyl methacrylate, tridecyl methacrylate, and the compounds shown by the following formula 4:

(4)

wherein $R^2$ represents an alkylene group having 5 carbon atoms and p is an integer from 1–3.

Commercially available products which can be used as component (b) include ARONIX M-101, M-102, M-111, M-113, M-114, M-117, TO-850, TO-851, TO-981, TO-1210, TO-1342 (manufactured by Toagosei Co., Ltd.); KAYARAD TC110S, R629, R644 (manufactured by Nippon Kayaku Co., Ltd.); VISCOAT 3700 (manufactured by Osaka Organic Chemical Industry, Ltd.), and the like.

The proportion of the mono-functional (meth)acrylate which is used as component (B) in this embodiment of the composition of the present invention should be in the range of 3–50 wt %, and preferably 5–40 wt %. If the proportion of the component (B) is less than 3 wt %, the Young's modulus of the cured products at low temperatures tends to be increased so that flexibility of the coating material is lost; if more than 50 wt %, coatability on glass fibers is low.

Mono-functional vinyl polymerizable compounds other than the above described compounds can be used in the composition of the present invention as component B, alone and in admixture. Examples of such vinyl polymerizable compounds are vinyl group-containing lactams such as N-vinyl pyrrolidone and N-vinyl caprolactam; (meth)acrylates containing an alicyclic structure such as cyclohexyl methacrylate, isobornyl (meth)acrylate, bornyl (meth)acrylate, tricyclodecanyl (meth)acrylate, and dicyclopentenyl (meth)acrylate; acryloylmorpholine, vinyl imidazole, vinyl pyridine, and the like. Other examples include methyl (meth)acrylate, ethyl (meth)acrylate, propyl (meth)acrylate,.t-butyl (meth)acrylate, isobutyl methacrylate, hexafluoro propyl methacrylate, tetrafluoropropyl methacrylate, trifluoroethyl methacrylate, hydroxypropyl methacrylate, cyclohexyl methacrylate, tetrahydrofurfuryl methacrylate, 2-hydroxyethyl methacrylate, 2-hydroxypropyl methacrylate, benzyl methacrylate, glycidyl methacrylate, stearyl methacrylate, cetyl acrylate, β-carboxyethyl acrylate, t-butylaminoethyl methacrylate, diacetone (meth)acrylamide, isobutoxymethyl (meth)acrylamide, N,N-dimethyl (meth)acrylamide, t-octyl (meth) acrylamide, 7-amino-3,7-dimethyloctyl (meth)acrylate, N,N-diethyl (meth)acrylamide, N,N-dimethylaminopropyl (meth)acrylamide, 2-acryloyloxyethyl-2-hydroxypropyl phthalate, and 2-hydroxy-3-(4-ter-butylphenoxy)propyl acrylate.

In addition, poly-functional vinyl polymerizable compounds can also be used in the composition of the present invention as component B. Included in examples of such poly-functional vinyl polymerizable compounds are trimethylolpropane tri(meth)acrylate, pentaerythritol tri(meth) acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth) acrylate, neopentyl glycol di(meth)acrylate, trimethylolpropane trioxyethyl (meth)acrylate, tris(2-hydroxyethyl) isocyanurate tri(meth)acrylate, tris(2-hydroxyethyl) isocyanurate di(meth)acrylate, tricyclodecanedimethanol di(meth)acrylate, di(meth)acrylate of a diol which is an addition compound of ethylene oxide or propylene oxide to bisphenol A, di(meth)acrylate of a diol which is an addition compound of ethylene oxide or propylene oxide to hydrogenated bisphenol A, epoxy (meth)acrylate obtained by adding (meth)acrylate to diglycidyl ether of bisphenol A, and triethylene glycol divinyl ether. Examples of commercially available products include YUPIMER UV SA1002, SA2007 (manufactured by Mitsubishi Chemical Corp.); VISCOAT 700 (manufactured by Osaka Organic Chemical Industry, Ltd.); KAYARAD R-604, DPCA-20, -30, -60, -120, HX-620, D-310, D-330 (manufactured by Nippon Kayaku Co., Ltd.); and ARONIX M-210, M-215, M-315, M-325 (manufactured by Toagosei Co., Ltd.). Among these, tricyclodecane dimethanol diacrylate (YUPIMER UV SA1002) or VISCOAT 700 are preferably used.

Generally, the vinyl polymerizable compound be formulated in an amount of from 15 to 80 wt. % and particularly from 20 to 70 wt. % to the total amount of the liquid curable resin composition. If the amount is less than 15 wt. %, the viscosity of the composition increases and hence not only the applicability is impaired, but also the toughness of the cured product decreases and the curing shrinkage coefficient increases. On the other hand, an amount exceeding 80 wt. % is undesirable because the curing speed decreases.

Preferably, the oligomer and the reactive diluent each contain an acrylate group as a radiation-curable group.

A key aspect of the present invention is that the compositions comprise at least one bisacylphosphine oxide type photoinitiator which is represented by the above formula (1). A preferred photoinitiator can be called bis(2,4,6-trimethylbenzoyl)phenylphosphine oxide. This photoinitiator can be synthesized by known methods or obtained from Ciba-Geigy either as a single photoinitiator (e.g., CGI 819) or as a blend with at least one other photoinitiator (e.g., CGI 1900).

The art already discloses methods for making bisacylphosphine oxide compounds of this type. For example, U.S. Pat. Nos. 5,218,009 and 5,534,559 disclose representative preparation strategies, the complete disclosure of which is fully incorporated herein by reference. When the compound of formula (1) is obtained as a blend of photoinitiators, the compound can be blended with conventional types of photoinitiator. For example, cost considerations may make a photoinitiator blend more attractive, although cost-performance must be considered.

Groups represented by $Ar^1$, $Ar^2$, or $Ar^3$ in the formula 1 of the present invention include aromatic groups which may include hetero atoms such as an oxygen atom, sulfur atom, or nitrogen atom. Preferably, $AR^1$–$AR^3$ independently represent alkylaryl, alkylaryloxy, alkyloxyaryl and preferably at least one of $R^1$–$R^3$ is a tri-substituted phenyl. Examples of suitable aromatic groups include phenyl group, methylphenyl group, ethylphenyl group, dimethylphenyl group, trimethylphenyl group, isopropylphenyl group, tert-butyl phenyl group, methoxy phenyl group, dimethoxy phenyl group, ethoxy phenyl group, diethoxy phenyl group, iso-propoxy phenyl group, thiomethoxy phenyl group, naphthyl group, thiophenyl group, and pyridyl group.

Preferably, $Ar^1$ includes phenyl and $Ar^2$ and $Ar^3$ includes alkylaryloxy.

Among these, the following compounds are preferably used as the photoinitiator. Specifically, these compounds include bis-(2,4,6-trimethylbenzoyl)-phenylphosphine oxide (hereinafter abbreviated as "BTBPO") represented by the following formula (5):

(5)

bis-(2,6-dimethylbenzoyl)-phenylphosphine oxide represented by the following formula (6):

(6)

bisbenzoyl phenylphosphine oxide represented by the following formula (7):

(7)

bis-(2,6-dimethoxybenzoyl) phenylphosphine oxide represented by the following formula (8):

(8)

and bisbenzoyl (2,4,6-trimethyl)phenylphosphine oxide represented by the following formula (9).

(9)

Among these, bis-(2,4,6-trimethylbenzoyl)-phenylphosphine oxide represented by formula (2) in which $Ar_1$ is a phenyl group, and $Ar_2$ and $Ar_3$ are a 2,4,6-trimethylphenyl group respectively, is preferable.

The photoinitiator generally is contained in the composition in a pre-mixture ingredient concentration of 0.05 wt. % or higher, preferably more than 0.1 wt. %, and more preferred, more than 2 wt. %. Generally, the amount will be about 15 wt. % or less, preferably about 10 wt. % or less and more preferably 5 wt. % or less to improve the curing speed of the liquid curable resin composition and the durability of the cured product. The amount will vary depending on the application. In considering an "effective amount", several factors can be considered including the nature of the other components in the composition, the type of material (e.g., inner or outer primary coating), the amount of non-yellowing which can be tolerated, the amount of surface versus through cure, and the like. The amount will be selected to provide for an optimal balance of properties for a particular application, key properties including good cure speed, non-yellowing character, and lack of harmful crystallization.

Compounds other than those represented by formula (1) may be jointly used as a photoinitiator in the liquid curable resin composition of the present invention. Also, a photosensitizer may be added as required.

Examples of the photoinitiator which are jointly used include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoinpropyl ether, benzoinethyl ether, benzyldimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, bis-(2,6-dimethoxybenzoyl)-2,4,4-trimethylpentylphosphine oxide and commercially available products such as IRGACURE 184, 369, 651, 500, 907, CGI1700, CGI1850, CG24-61 (Ciba-Geigy Ltd.), LUCIRIN LR8728 (BASF), DAROCURE 1116, 1173 (Merck Co.), UBECRYL P36 (UCB Co.), and the like.

It is preferred to exclude atmospheric oxygen during the polymerization, which may be effected by $N_2$ purge, or by adding paraffin or similar wax-like substances which, at the onset of polymerization, migrate to the surface owing to lack of solubility in the polymer and form a transparent film which prevents air from entering the system. The inhibiting effect of atmospheric oxygen may also be overcome by combining accelerators (or synergists) with the photoinitiators. Examples of such accelerators or photosensitizers include secondary and/or tertiary amines, such as, dimethylethanolamine, triethanolamine, benzyldimethylamine, dimethylaminoethyl acrylate, N-phenylglycine, N-methyl-N-phenylglycine, triethylamine, diethylamine, N-methyldiethanolamine, ethanolamine, 4-dimethylaminobenzoic acid, methyl 4-dimethylamino benzoate, ethyl 4-dimethylaminobenzoate, isoamyl 4-dimethylamino benzoate, and commercially available products such as UBECRYL P102, 103, 104, 105 (UCB Co.)

Aliphatic and aromatic halides, such as, 2-chloromethyl-naphthalene and 1-chloro-2-chloromethyl-naphthalene, and compounds which form free radicals, for example, peroxides and azo compounds, may also be used to accelerate the hardening.

These photoinitiators are formulated in the composition in an amount of from 0 to 10% and preferably from 0 to 4%.

The radiation-curable composition should not comprise ingredients which adversely affect the desired balance of properties including non-yellowing, fast cure speed, and lack of crystalline inclusions. For example, commercial LUCIRIN TPO should not be used to the extent that it causes crystalline inclusions. The amount of LUCIRIN TPO preferably is less than about 0.5 wt. %, and more preferably, less than about 0.1 wt. %, and most preferably, less than about 0.05 wt. %.

Beside the above-described components, other curable oligomers, polymers, reactive diluents, and the other additives may be added to the liquid curable resin composition of the present invention as required, to the extent that the characteristics of the composition are not adversely affected.

Examples of such other curable oligomers and polymers include polyester (meth)acrylate, epoxy (meth)acrylate, polyamide (meth)acrylate, siloxane polymer containing a (meth)acryloyloxy group, and reactive polymers obtained by reacting acrylic acid and a copolymer of glycidyl methacrylate and other vinyl monomer.

Included in various additives which can be optionally used in addition to the above-mentioned components are antioxidants, colorants, UV absorbers, light-stabilizers, silane coupling agents, thermal polymerization inhibitors, leveling agents, surfactants, preservatives, plasticizers, lubricants, solvents, fillers, aging preventives, wettability improvers, coating surface improvers, pigments, dyes and the like.

Examples of antioxidants include IRGANOX 1010, 1035, 1076, 1222 (manufactured by Ciba-Geigy Ltd.), ANTIGENE P, 3C, FR, GA-80 (manufactured by Sumitomo Chemical Industries Co., Ltd.); Examples of UV absorbers include TINUVIN P, 234, 320, 326, 327, 328, 329, 213 (manufactured by Ciba-Geigy), SEESORB 102, 103, 501, 202, 712, 704 (manufactured by Sypro Chemical Co., Ltd.); Examples of light stabilizers include TINUVIN 292, 144, 622LD (manufactured by Ciba-Geigy), SANOL LS770 (manufactured by Sankyo Co., Ltd.), SUMISORB TM-061 (manufactured by Sumitomo Chemical Industries Co., Ltd.); and examples of silane coupling agents include γ-aminopropyltriethoxysilane, γ-mercaptopropyl-trimethoxysilane, γ-methacryloxypropyl-trimethoxysilane, and commercially available products such as SH6062, 6030 (manufactured by Toray-Dow Corning Silicone Co., Ltd.), KBE 903, 603, 403 (manufactured by Shin-Etsu Chemical Co., Ltd.)

The viscosity of the liquid curable resin composition of the present invention is usually in the range of 200–20,000cp/25° C., and preferably 1,500–15,000cp/25° C.

The composition after curing should have a Young's modulus of 10 to 250 kg/mm$^2$ when used as a secondary coating material of elemental optical fibers or a bundling material of optical fiber ribbon matrix. When it is used as a primary coating material for elemental optical fibers, it is preferable that the Young modulus of the cured product be from 0.05 to 0.3 kg/mm$^2$.

The composition of the present invention is cured by heat and/or radiation. Here radiation includes infrared radiation, visible and/or ultraviolet radiation, X-rays, electron beams, α-rays, β-rays, γ-rays, and the like.

Preferably, the radiation-curable compositions can be cured by conventional means. For example, the radiation source can be a conventional light source such as, for example, UV lamps available from Fusion Systems Corp. In addition, low-, medium-, and high-pressure mercury lamps, superactinic fluorescent tubes or pulse lamps are suitable. UV cure of compositions according to the present invention are preferred.

For example, a composition according to the present invention is one comprising about 60–70 wt. % of an oligomer prepared from PTGL2000 polyether polyol, IPDI (isophorone diisocyanate), and HEA (hydroxyethyl acrylate); about 20–30 wt. % of ethoxylated nonylphenol acrylate monomer diluent; about 5–10 wt. % of lauryl acrylate monomer diluent; about 2–5 wt. % bisacylphosphine oxide photoinitiator according to formula (I); 0.3 wt. % Irganox 1035 (hindered phenol antioxidant); and about 1.0 wt. % A-189 (mercaptopropyltrimethoxy silane coupling agent).

In a ribbon configuration, the coating composition may comprise a release agent to allow for easy access to the individual fibers. Suitable release agents include silicones, silicone acrylates, fluoro-carbon oils or resins and the like. Where such agents are used, the optical fiber coatings preferably comprise 0.5–20 wt. % of a suitable release agent.

Non-yellowing is an important aspect of the cured compositions of the present invention. Preferably, radiation-curable compositions are substantially colorless immediately after formulation. However, some radiation-curable compositions exhibit some yellow color immediately after formulation, but photobleach upon cure. Color measurements are discussed in, for example, Heinrich Zollinger's *Color Chemistry*, 2nd. Ed., VCH (1991), Chapter 2.7, and references cited therein, which is hereby incorporated by reference. Color measurements are also disclosed in, for example, Billmeyer & Saltzman, *Principles of Color Technology*, 2nd. Ed., Wiley-Interscience (1981). Conventional methods using, for example, delta E values can be used to determine non-yellowing behavior, which is hereby incorporated by reference.

Cure speed can be measured e.g. by dose-modulus curves as known in the art. Cure speed can be taken as the dose required to effect 95% of the maximum modulus as is shown in Example 15. Cure speed will vary depending on the type of composition (e.g., inner versus outer primary coating). In the present invention, cure speeds were obtained using the photoinitiator of formula (1) which were substantially comparable to the cure speeds obtained with use of Lucirin TPO (which are faster than those obtained with use of Irgacure 1700).

Cured compositions can be examined for particulate matter, such as crystalline inclusions, by optical microscopic methods. Conventional methods can be used to examine for these effects, although increasingly more stringent, high resolution analysis is required. Aging of cured films at, for example, 125° C., or at 95° C./95% relative humidity can be carried out to test for crystallization effects. Phase behavior can also be examined with use of a Polaroid camera, in a reflected light using differential interference contrast microscopy and a Leitz microscope. Magnifications of, for example, 200× or 500× can be used to determine crystallization and phase behavior effects.

EXAMPLES

The present invention will be explained in more detail by way of examples, which are not intended to be limiting of the present invention. In the examples hereinafter "parts by weight" is simply described as "parts".

Urethane Acrylate Resin Composition Example 1

18.2 g of 2,4-tolylene diisocyanate, 0.055 g of dibutyl tin dilaurate, 0.017 g of 2,6-di-t-butyl-p-cresol, and 15.7 g of tricyclodecane dimethanol diacrylate were placed in a reaction vessel equipped with a stirrer and cooled below 15° C. Then, 17.0 g of 2-hydroxyethyl acrylate was added dropwise to the mixture while stirring to maintain the temperature below 30. After the addition was finished, the resulting mixture was reacted at 30° C. for one hour. Next, 3.0 g of tricyclodecane dimethanol (Mitsubishi Chemical Corp.), 30.7 g of a ring-opening copolymer of tetrahydrofuran and 3-methyl tetrahydrofuran having a number average molecular weight of 2,000 were added to the reaction mixture and the resulting mixture was stirred at 20 to 55° C. to react. When the amount of residual isocyanate was 0.1% by weight, the reaction was terminated to obtain a reaction solution of urethane acrylate polymer having a number average molecular weight of 1,670. To the reaction solution were added 8.1 g of N-vinylpyrrolidone, 6.9 g of isobornyl acrylate, and 0.3 g of Irganox 1035 (Ciba-Geigy), followed by stirring while controlling the temperature at 50 to 60° C. until a homogeneous transparent liquid was obtained. This resin solution is hereinafter designated as "liquid resin UA-1".

Urethane Acrylate Resin Composition Example 2

13.3 g of 2,4-tolylene diisocyanate, 0.04 g of dibutyl tin dilaurate, 0.012 g of 2,6-di-t-butyl-p-cresol, and 17.9 g of isobornyl acrylate were placed in a reaction vessel equipped with a stirrer and cooled below 15° C. Then, 7.0 g of 2-hydroxyethyl acrylate was added dropwise to the mixture while stirring to maintain the temperature below 30° C. After the addition was finished, the resulting mixture was reacted at 30° C. for one hour. Next, 10.0 g of PLACCEL 205H (polycaprolactone diol, manufactured by Daicel Chemical Industries, Ltd.), 5.1 g of polyethylene oxide addition diol of bisphenol A having a number average molecular weight of 400, and 14.5 g of a ring-opening copolymer of tetrahydrofuran and 3-methyl tetrahydrofuran having a number average molecular weight of 1,000 were added to the reaction mixture and the resulting mixture was stirred at 50 to 60° C. When the amount of residual isocyanate was 0.1% by weight, the reaction was terminated to obtain a reaction solution of urethane acrylate polymer having a number average molecular weight of 1,650. To the reaction solution were added 15.9 g of vinylcaprolactam, 8.0 g of SA1002 (a polyfunctional reactive diluent, manufactured by Mitsubishi Chemical Corp.), and 0.3 g of IRGANOX 1035 (Ciba-Geigy), followed by stirring while controlling the temperature at 50 to 60° C. until a homogeneous transparent liquid was obtained. This resin solution is hereinafter designated as "liquid resin UA-2".

Urethane Acrylate Resin Composition Example 3

15.9 g of isophorone diisocyanate, 0.046 g of dibutyl tin dilaurate, 0.014 g of 2,6-di-t-butyl-p-cresol, and 12.4 g of tricyclodecane dimethanol diacrylate were placed in a reaction vessel equipped with a stirrer and cooled below 15° C. Then, 11.0 g of 2-hydroxyethyl acrylate was added dropwise to the mixture while stirring to maintain the temperature below 30° C. After the addition was finished, the resulting mixture was reacted at 30° C. for one hour. Next, 4.5 g of polyethylene oxide addition diol of bisphenol A having a number average molecular weight of 400 was added and reacted with the mixture. Then, 26.4 g of polytetramethylene glycol having a number average molecular weight of 2,000 was added and reaction with the reacted mixture at 50 to 60° C. When the amount of residual isocyanate was 0.1% by weight, the reaction was terminated to obtain a reaction solution of urethane acrylate polymer having a number average molecular weight of 1,960. To the reaction solution were added 9.1 g of N-vinylpyrrolidone, 7.8 g of isobornyl acrylate, 12.5 g of VISCOAT 700 (a polyfunctional reactive diluent, manufactured by Osaka Organic Chemical Industry, Ltd.), 0.3 g of IRGANOX 1035 (Ciba-Geigy), 0.2 g of TINUVIN 292 (Ciba-Geigy), and 0.1 g of diethylamine, and SH190 (Toray-Dow Corning Silicone Co., Ltd.), followed by stirring while controlling the temperature at 50 to 60° C. until a homogeneous transparent liquid was obtained. This resin solution is hereinafter designated as "liquid resin UA-3".

Urethane Acrylate Resin Composition Example 4

3.3 g of 2,4-tolylene diisocyanate, 51.0 g of a ring-opening copolymer of ethylene oxide having a number average molecular weight of 4,000 and butene oxide, 22.6 g of ARONIX M-113 (Toagosei Co., Ltd.), and 0.013 g of 2,6-di-t-butyl-p-cresol were placed in a reaction vessel equipped with a stirrer and cooled with ice while stirring until the temperature was below 10° C. When the temperature was below 10° C., 0.045 g of dibutyl tin dilaurate was added to the mixture. The resulting mixture was stirred for two hours while controlling the temperature at 20 to 30° C. Then, 0.3 g of SH6062 (Toray-Dow Corning Silicone Co., Ltd.) was added to the mixture, which was stirred at 30 to 40° C. for one hour. After the stirring was finished, 1.3 g of 2-hydroxyethyl acrylate was added to the resulting mixture, followed by stirring at 50 to 60° C. for 4 hours. When the amount of residual isocyanate was 0.1% by weight, the reaction was terminated to obtain a reaction solution of urethane acrylate polymer having a number average molecular weight of 8,750. To the reaction solution were added 3.0 g of N-vinylcaprolactam, 10.1 g of ARONIX M-114 (a monofunctional reactive diluent, manufactured by Toagosei Co., Ltd.), 7.1 g of lauryl acrylate, 0.8 g of IRGANOX 1035 (Ciba-Geigy), 0.3 g of SEESORB 103 (Sypro Chemical Co.), and 0.1 g of diethylamine, followed by stirring at 40 to 50° C. to obtain a homogeneous transparent liquid. This resin solution is hereinafter designated as "liquid resin UA-4".

Urethane Acrylate Resin Composition Example 5

6.7 g of 2,4-tolylene diisocyanate, 0.049 g of dibutyl tin dilaurate, 0.051 g of 2,6-di-t-butyl-p-cresol, 0.005 g of phenothiazine, and 16.5 g of ARONIX M-113 were placed in a reaction vessel equipped with a stirrer and cooled below 15° C. Then, 3.0 g of 2-hydroxyethyl acrylate was added dropwise to the mixture while stirring to maintain the temperature below 30° C. After the addition was finished, the resulting mixture was reacted at 30° C. for one hour. Next, 51.1 g of a, ring-opening copolymer of tetrahydrofuran having a number average molecular weight of 2,000 and 3-methyl tetrahydrofuran were added to the reaction mixture and the resulting mixture was stirred at 20 to 55° C. to react. When the amount of residual isocyanate was 0.1% by weight, the reaction was terminated to obtain a reaction solution of urethane acrylate polymer having a number average molecular weight of 4,700. To the reaction solution were added 11.0 g of isobornyl acrylate, 4.9 g of vinylcaprolactam, 5.7 g of lauryl acrylate, and 0.2 g of Irganox 1035, followed by stirring for 30 minutes while controlling the temperature at 40 to 50° C. until a homogeneous transparent liquid was obtained. Then, the solution was further stirred while controlling the temperature at 30 to 40° C. and 0.1 g of diethylamine was added, followed by stirring for 30 minutes. After that, 0.8 g of SH6062 was added and the mixture was stirred at 40 to 50° C. to homogenize, thereby obtaining a resin solution. This resin solution is hereinafter designated as "liquid resin UA-5".

Urethane Acrylate Resin Composition Example 6

8.2 g of isophorone diisocyanate, 49.0 g of a ring-opening copolymer of ethylene oxide and butene oxide having a number average molecular weight of 2,000, 25.4 g of ARONIX M-113, and 0.015 g of 2,6-di-t-butyl-p-cresol were placed in a reaction vessel equipped with a stirrer and cooled with ice while stirring until the temperature was below 10° C. while agitating. 0.049 g of dibutyl tin dilaurate was added to the mixture. The resulting mixture was stirred for two hours while controlling the temperature at 20 to 30° C. After that, 0.60 g of SH6062 was added, followed by stirring at 30 to 40° C. for one hour. Then, 3.0 g of 2-hydroxyethyl acrylate was added to the mixture, which was stirred at 50 to 60° C. for 4 hours. When the amount of residual isocyanate was 0.1% by weight, the reaction was terminated to obtain a reaction solution of urethane acrylate polymer having a number average molecular weight of 3,870. To the reaction solution were added 3.0 g of N-vinylcaprolactam, 9.6 g of ARONIX M-102 (a monofunctional reactive diluent, manufactured by Toagosei Co., Ltd.), 1.0 g of IRGANOX 1035, and 0.1 g of diethylamine, followed by stirring at 40 to 50° C. to obtain a homogeneous transparent resin liquid. This resin solution is hereinafter designated as "liquid resin UA-6".

Urethane Acrylate Resin Composition Example 7

4.6 g of 2,4-tolylene diisocyanate, 0.041 g of dibutyl tin dilaurate, 0.012 g of 2,6-di-t-butyl-p-cresol, 0.004 g of phenothiazine, and 26.4 g of ARONIX M113 were placed in a reaction vessel equipped with an agitator and cooled below 15° C. Then, 2.0 g of 2-hydroxyethyl acrylate was added dropwise to the mixture while stirring to maintain the temperature below 30° C. After the addition was finished, the resulting mixture was reacted at 30° C. for one hour. Next, 26.5 g of polypropylene glycol having a number average molecular weight of 3,000 was added to the reaction mixture and the resulting mixture was stirred at 20 to 55° C. for one hour. Then, 17.6 g of polytetramethylene glycol having a number average molecular weight of 2,000 was added to the mixture and the resulting mixture was stirred at 50 to 60° C. to react. When the amount of residual isocyanate was 0.1% by weight, the reaction was terminated to obtain a reaction solution of urethane acrylate polymer having a number average molecular weight of 5,750. To the reaction solution were added 7.0 g of vinylcaprolactam, 15.0 g of lauryl acrylate, and 0.3 g of IRGANOX 1035, followed by stirring for 30 minutes while controlling the temperature at 40 to 50° C. until a homogeneous transparent liquid was obtained. Then, the transparent liquid was further stirred while controlling the temperature at 30 to 40° C. 0.15 g of diethylamine was added to the transparent liquid, followed by stirring at 40 to 50° C. for 30 minutes to homogenize, thereby obtaining a resin solution. This resin solution is hereinafter designated as "liquid resin UA-7".

Examples 1 to 7 and Comparative Examples A to G

The components of the compositions listed in Table 1 were placed in a reaction vessel equipped with a stirrer and agitated for 3 hours while controlling the temperature at 50 to 60° C. to obtain the compositions (Examples 1 to 7) of the present invention and comparative compositions (Comparative Examples A to G).

TABLE 1

|  | Example | | | | | | | Comparative Example | | | | | | |
| --- | --- | --- | --- | --- | --- | --- | --- | --- | --- | --- | --- | --- | --- | --- |
|  | 1 | 2 | 3 | 4 | 5 | 6 | 7 | A | B | C | D | E | F | G |
| Resin liquid (parts) | | | | | | | | | | | | | | |
| UA-1 | 98 | — | — | — | — | — | — | 98 | — | — | — | — | — | — |
| UA-2 | — | 98 | — | — | — | — | — | — | 98 | — | — | — | — | — |
| UA-3 | — | — | 97 | — | — | — | — | — | — | 97 | — | — | — | — |
| UA-4 | — | — | — | 98 | — | — | — | — | — | — | 96 | — | — | — |
| UA-5 | — | — | — | — | 98 | — | — | — | — | — | — | 98 | — | — |
| UA-6 | — | — | — | — | — | 98 | — | — | — | — | — | — | 98 | — |
| UA-7 | — | — | — | — | — | — | 98 | — | — | — | — | — | — | 98 |
| Photoinitiator (parts) | | | | | | | | | | | | | | |
| BTBPO | 2 | 1 | 2 | 2 | 2 | 2 | 2 | — | — | — | — | — | — | — |
| Irgacure 184 | — | 1 | — | — | — | — | — | 2 | 1 | — | 4 | — | — | — |
| Irgacure 907 | — | — | 1 | — | — | — | — | — | — | 1 | — | — | — | — |
| Lucirin | — | — | — | — | — | — | — | — | 1 | 2 | — | 2 | — | — |
| BBTPO | — | — | — | — | — | — | — | — | — | — | — | — | 2 | 2 |

In Table 1, BTBPO stands for bis-(2,4,6-trimethylbenzoyl)-phenylphosphine oxide, which has the structure shown by formula (5) above.

IRGACURE 184 is a photoinitiator having the structure shown by the following formula (10).

LUCIRIN is a photoinitiator having the structure shown by the following formula (11).

IRGACURE 907 is a photoinitiator having the structure shown by the following formula (12).

BBTPO stands for bis-(2,6-dimethoxybenzoyl)-2,4,4-trimethylpentylphosphine oxide, which has the structure shown by the following formula (13).

IRGACURE 184, LUCIRIN, IRGACURE 907, and BBTPO are not contained in the photoinitiator represented by formula (1).

Test Example

The liquid curable resin compositions prepared in the above examples were cured by the following method to prepare test specimens, which were evaluated by the method described below. The results are shown in Table 2.

1. Preparation of Test Specimen

The liquid curable resin composition was applied to a glass plate using an applicator bar for a 250 micron thickness and irradiated with UV rays at a dose of 1 $J/cm^2$ under air atmosphere. The cured film remained on the glass plate was subjected to a heat resistance test.

In a test for evaluating a curing speed, UV rays were irradiated at a dose of 10 $mJ/cm^2$ or 100 $mJ/cm^2$ under a nitrogen stream to obtain a cured film.

2. Heat Resistance Test, and Measurement of Color Change

The test specimen was heated at 120° C. in a thermostatic chamber for 7 days. The test specimen were subjected to a color difference meter (COLOR ANALYZER TC-1800N, manufactured by Tokyo Denshoku Co., Ltd.) before and after the heat resistance test to measure the values of ΔE and YI and thereby to measure color change.

3. Determination of Curing Speed

The cure rate was evaluated by extracting the UV cured resin with methyl ethyl ketone using a Soxhlet extractor, drying the residue under vacuum, and measuring the weight of the remaining ultraviolet radiation cured resin (gel content). The ratio of the gel content of the film cured under a radiation of 100 $mJ/cm^2$ and that cured under a radiation of 10 $mJ/cm^2$ was calculated.

4. Determination of Solubility

All components of the compositions listed in Table 1 were placed in a reaction vessel and stirred at 50 to 60° C. for 3 hours. The case where a homogeneous transparent solution was obtained was determined as "pass" and the case where undissolved solid components remained was judged as "not pass".

TABLE 2

| | Example | | | | | | | Comparative Example | | | | | | |
|---|---|---|---|---|---|---|---|---|---|---|---|---|---|---|
| | 1 | 2 | 3 | 4 | 5 | 6 | 7 | A | B | C | D | E | F | G |
| Curing speed (gel content (%)) | | | | | | | | | | | | | | |
| $G_{100}$ (dose: 100 $mJ/cm^2$) | 97.0 | 96.6 | 97.1 | 92.0 | 93.1 | 91.8 | 92.5 | 94.5 | 95.5 | 96.6 | 89.9 | 91.0 | — | — |
| $G_{10}$ (dose: 10 $mJ/cm^2$) | 94.4 | 93.7 | 95.2 | 89.4 | 91.2 | 84.0 | 88.8 | 81.3 | 84.0 | 84.0 | 62.9 | 71.0 | — | — |
| Ratio of gel content ($G_{10}/G_{100}$) | 0.97 | 0.97 | 0.98 | 0.97 | 0.98 | 0.97 | 0.96 | 0.86 | 0.88 | 0.87 | 0.70 | 0.78 | — | — |

TABLE 2-continued

|  | Example | | | | | | | Comparative Example | | | | | | |
| --- | --- | --- | --- | --- | --- | --- | --- | --- | --- | --- | --- | --- | --- | --- |
|  | 1 | 2 | 3 | 4 | 5 | 6 | 7 | A | B | C | D | E | F | G |
| Heat resistance test |  |  |  |  |  |  |  |  |  |  |  |  |  |  |
| (Change in hue YI) | 2.1 | 2.3 | 3.0 | 2.6 | 2.4 | 2.0 | 2.9 | 2.0 | 2.5 | 3.4 | 2.4 | 2.5 | — | — |
| Initial stage | 8.9 | 9.0 | 10.2 | 8.1 | 8.8 | 7.9 | 10.0 | 11.0 | 16.2 | 19.8 | 8.5 | 15.4 | — | — |
| 120° C. x 7 days |  |  |  |  |  |  |  |  |  |  |  |  |  |  |
| solubility | pass | pass | pass | pass | pass | pass | pass | pass | pass | pass | pass | pass | not pass | not pass |

As shown in Table 2, the cured products prepared from the resin composition using the photoinitiator represented by formula (1) had a high curing speed and changed only a little in color both under high temperature conditions and under conditions of light irradiation, exhibiting excellent durability. The solubility was also excellent so that a homogeneous solution could be prepared if the composition was stirred for 3 hours.

Synthesis of Urethane Acrylate (8)

109.8 g of 2,4-tolylene diisocyanate, 841.4 g of a ring-opening polymer of tetrahydrofuran with a number average molecular weight of 2,000 (PTMG2000, manufactured by Mitsubishi Chemical Corp.), 200 g of lauryl acrylate (LA, manufactured by Osaka Organic Chemical Industry Co., Ltd.), and 0.3 g of 2,6-di-t-butyl-p-cresol were added to a reaction vessel equipped with a stirrer and the mixture was cooled with ice to 10° C. or below while stirring. When the liquid temperature became lower than 10° C., 0.9 g of dibutyl tin dilaurate was added and the mixture was stirred for one hour at 30–40° C. Then, 48.8 g of 2-hydroxyethyl acrylate was added and the mixture was stirred for a further four hours at 50–60° C. The reaction was terminated when the amount of residual isocyanate was 0.1 wt % or less, thus obtaining a urethane acrylate polymer liquid with a number average molecular weight of 4,754. This urethane acrylate is designated as urethane acrylate (8). This resin liquid is a mixture of 1,000 g of urethane acrylate (8) which is the component (a) and 200 g of lauryl acrylate which is a monofunctional monomer of the component (b).

Synthesis of Urethane Acrylate (9)

The same reaction as the synthesis of urethane acrylate (1) was carried out, except for using a ring-opening copolymer of tetrahydrofuran and 3-methyl tetrahydrofuran with a number average molecular weight 2,000 (PTGL2000, manufactured by Hodogaya Chemical Co., Ltd.) instead of the ring-opening polymer of tetrahydrofuran with a number average molecular weight 2,000, to obtain a urethane acrylate polymer liquid with a number average molecular weight of 4,754 which is a reaction product of urethane acrylate and lauryl acrylate (used as a monofunctional acrylate). This resin liquid is a mixture of 1,000 g of the urethane acrylate (9) which is the component (a) and 200 g of lauryl acrylate which is a mono-functional monomer of the component (b).

Synthesis of Urethane Acrylate (10)

136 g of isophorone diisocyanate, 815.3 g of a ring-opening copolymer of ethylene oxide and butene oxide with a number average molecular weight of 2,000 (PBG2000A, manufactured by Daiichi Kogyo Seiyaku Co., Ltd.), 200 g of a phenol EO-modified (2 mol) acrylate (M-101, monofunctional acrylate manufactured by Toagosei Co., Ltd.), and 0.3 g of 2,6-di-t-butyl-p-cresol were charged in a reaction vessel equipped with a stirrer and the mixture was cooled with ice to 10° C. or below while stirring. Then, 0.9 g of dibutyl tin dilaurate was added and the mixture was stirred for two hours at 20–30° C. Next, 4 g of γ-mercaptopropyltrimethoxysilane (SH6062, a silane coupling agent manufactured by Toray-Dow Corning Silicone Co., Ltd.) was added and the mixture was stirred for one hour at 30–40° C., followed by addition of 44.9 g of 2-hydroxyethyl acrylate. The mixture was stirred for a further four hours at 50–60° C. until it was confirmed that the amount of residual isocyanate was 0.1 wt % or less, thus obtaining a urethane acrylate polymer liquid with a number average molecular weight of 4,906. This urethane acrylate is designated as urethane acrylate (10). This resin liquid is a mixture of 1,000 g of urethane acrylate (10) which is the component (a) and 200 g of a phenol EO-modified (2 mol) acrylate which is a monofunctional monomer of the component (b).

Synthesis of Urethane Acrylate (11)

136 g of isophorone diisocyanate, 816.7 g of a ring-opening copolymer of ethylene oxide and butene oxide with a number average molecular weight of 2,000, 200 g of a nonylphenol EO-modified (8 mol) acrylate (M-114, monofunctional acrylate manufactured by Toagosei Co., Ltd.), and 0.3 g of 2,6-di-t-butyl-p-cresol were added to a reaction vessel equipped with a stirrer and the mixture was cooled with ice to 10° C. or below while stirring. Then, 0.9 g of dibutyl tin dilaurate was added and the mixture was stirred for two hours at 20–30° C. Next, 47.4 g of 2-hydroxyethyl acrylate was added and the mixture was stirred for a further four hours at 50–60° C. until it was confirmed that the amount of residual isocyanate was 0.1 wt % or less, thus obtaining a urethane acrylate polymer liquid with a number average molecular weight of 4,898. This urethane acrylate is designated as urethane acrylate (11). This resin liquid is a mixture of 1,000 g of urethane acrylate (11) which is the component (a) and 200 g of a nonylphenol EO-modified (8 mol) acrylate which is a mono-functional monomer of the component (b).

Synthesis of Urethane Acrylate (12)

96.5 g of isophorone diisocyanate, 869.8 g of a ring-opening polymer of propylene oxide with a number average molecular weight of 3,000, 100 g of lauryl acrylate which is a monofunctional acrylate, and 0.3 g of 2,6-di-t-butyl-p-cresol were added to a reaction vessel equipped with a stirrer and the mixture was cooled with ice to 10° C. or below while stirring. Then, 0.9 g of dibutyl tin dilaurate was added and the mixture was stirred for two hours at 20–30° C. Next, 33.6 g of 2-hydroxyethyl acrylate was added and the mixture was stirred for a further four hours at 50–60° C. until it was confirmed that the amount of residual isocyanate was 0.1 wt % or less, thus obtaining a urethane acrylate polymer liquid with a number average molecular weight of 6,898. This urethane acrylate is designated as urethane acrylate (12). This resin liquid is a mixture of 1,000 g of urethane acrylate (12) which is the component (a) and 100 g of lauryl acrylate which is the mono-functional monomer of component (b).

Synthesis of Urethane Acrylate (13)

56.2 g of 2,4-tolylene diisocyanate, 922.4 g of a ring-opening copolymer of ethylene oxide and butene oxide with a number average molecular weight of 4,000 (PBG2000B manufactured by Daiichi Kogyo Seiyaku Co., Ltd.), 200 g of a nonylphenol EO-modified (4 mol) acrylate (ARONIX M-113, monofunctional acrylate manufactured by Toagosei Co., Ltd.), and 0.3 g of 2,6-di-t-butyl-p-cresol were added to a reaction vessel equipped with a stirrer and the mixture was cooled with ice to 10° C. or below while stirring. Then, 0.9 g of dibutyl tin dilaurate was added and the mixture was stirred for two hours at 20–30° C. Next, 21.4 g of 2-hydroxyethyl acrylate was added and the mixture was stirred for a further four hours at 50–60° C. until it was confirmed that the amount of residual isocyanate was 0.1 wt % or less, thus obtaining a urethane acrylate polymer liquid with a number average molecular weight of 10,841.

This urethane acrylate is designated as urethane acrylate (13). This resin liquid is a mixture of 1,000 g of urethane acrylate (13) which is the component (a) and 200 g of a nonylphenol EO-modified (4 mol) acrylate which is a mono-functional monomer of the component (b).

Synthesis of Urethane Acrylate (14)

90.7 g of 2,4-tolylene diisocyanate, 0.9 g of dibutyl tin dilaurate, 0.3 g of 2,6-di-t-butyl-p-cresol, and 200 g of lauryl acrylate which is a monofunctional acrylate were added to a reaction vessel equipped with a stirrer and the mixture was cooled to 15° C. or below while stirring. Then, 40.3 g of 2-hydroxyethyl acrylate was added dropwise while controlling the temperature at 30° C. or lower with stirring, followed by further stirring for one hour at 30° C. Next, 521.4 g of polypropylene glycol with a number average molecular weight of 3,000 was added and the mixture was stirred for one hour at 20–55° C., followed by the addition of 347.6 g of polytetramethylene glycol which is a ring-opening polymer of tetrahydrofuran with a number average molecular weight of 2,000. The mixture was reacted at 50–60° C. until it was confirmed that the amount of residual isocyanate was 0.1 wt % or less, thus obtaining a urethane acrylate polymer liquid with a number average molecular weight of 5,754. This urethane acrylate is designated as urethane acrylate (14). This resin liquid is a mixture of 1,000 g of urethane acrylate (14) which is the component (a) and 200 g of lauryl acrylate which is a mono-functional monomer of the component (b).

Examples 8–14 and Comparative Examples H–K

Preparation of Liquid Curable Resin Compositions

The components shown in Tables 3 and 4 were charged into a reaction vessel equipped with a stirrer. The mixture was stirred for 3 hours while controlling the temperature at 40–50° C. to prepare liquid curable resin compositions. (Examples 8–14 and Comparative Examples H–K).

TABLE 3

| COMPOSITION (g) | EXAMPLES | | | | | | |
|---|---|---|---|---|---|---|---|
| | 8 | 9 | 10 | 11 | 12 | 13 | 14 |
| Urethane acrylate (8) | 50 | | | | | | |
| Urethane acrylate (9) | | 55 | | | | | |
| Urethane acrylate (10) | | | 65 | | | | |
| Urethane acrylate (11) | | | | 65 | | | |
| Urethane acrylate (12) | | | | | 70 | | |
| Urethane acrylate (13) | | | | | | 50 | |
| Urethane acrylate (14) | | | | | | | 60 |
| Lauryl acrylate | 10 | 15 | | 7 | 10 | | 13 |
| Phenol EO-modified (2 mols) acrylate | | | 15 | | | | |
| Nonylphenol EO-modified (4 mols) acrylate | 17 | | | | 6 | 19 | 19 |
| Nonylphenol EO-modified (8 mols) acrylate | | | | 13 | | | |
| 2-Hydroxy-3-phenoxy-propyl acrylate | | | | | 8 | 21 | |
| Caprolactone-modified tetrahydrofurfuryl acrylate | | 15 | | | | | |
| Isobornyl acrylate | 14 | 7.7 | 9 | | 5 | | |
| vinyl caprolactam | 6.7 | 5 | | 4.7 | 4.7 | 6.7 | 5.7 |
| vinyl pyrrolidone | | | 6.2 | | | | |
| Tricyclodecanemethanol monoacrylate | | | | | | | |
| 1,6-Hexane diol diacrylate | | | | 2 | | | |
| Polyethylene glycol diacrylate | | | | | 2 | | |
| BTBPO | 2 | 1 | 1 | 1 | 2 | 1 | 2 |
| Luairin TPO | | | | | 1 | | |
| Irgacure 184 | | | 1.5 | | | 2 | |
| Irgacure 907 | | 1 | | | | | |
| BBTPO | | | | | | | |
| Antioxidant | 0.2 | 0.2 | 0.2 | 0.2 | 0.2 | 0.2 | 0.2 |
| Diethylamine | 0.1 | 0.1 | 0.1 | 0.1 | 0.1 | 0.1 | 0.1 |

TABLE 4

| | COMPARATIVE EXAMPLES | | |
|---|---|---|---|
| | H | J | K |
| Urethane acrylate (8) | | | |
| Urethane acrylate (9) | | | |
| Urethane acrylate (10) | | | |
| Urethane acrylate (11) | 65 | | |
| Urethane acrylate (12) | | 70 | |
| Urethane acrylate (13) | | | |
| Urethane acrylate (14) | | | 60 |
| Lauryl acrylate | 7 | 10 | 13 |
| Phenol EO-modified (2 mols) acrylate | | | |
| Nonylphenol EO-modified (4 mols) acrylate | | 6 | 19 |
| Nonylphenol EO-modified (8 mols) acrylate | 11 | | |
| 2-Hydroxy-3-phenoxy-propyl acrylate | | 10 | |
| Caprolactone-modified tetrahydrofurfuryl acrylate | | | |
| Isobornyl acrylate | | 5 | |
| Vinyl caprolactam | 4.7 | 3.9 | 5.7 |
| Vinyl pyrrolidone | | | |
| Tricyclodecanemethanol monoacrylate | | | |
| 1,6-Hexane diol diacrylate | | | |
| Polyethylene glycol diacrylate | | 2 | |
| BTBPO | | | |
| Lucirin TPO | | | |

TABLE 4-continued

| | COMPARATIVE EXAMPLES | | |
|---|---|---|---|
| | H | J | K |
| Irgacure 184 | | | |
| Irgacure 907 | | 1 | 2 |
| BBTPO | 2 | 1.8 | |
| Antioxidant | 0.2 | 0.2 | 0.2 |
| Diethylamine | 0.1 | 0.1 | 0.1 |

In the Tables 3 and 4, the figures represent the amounts of components (g); the nonylphenol EO-modified (8 mols) acrylate is ARONIX M114 manufactured by Toagosei Co., Ltd.; 2-hydroxy-3-phenoxypropyl acrylate is an epoxy ester M600A manufactured by Kyoeisha Chemical Co., Ltd.; caprolactone modified tetrahydrofurfuryl acrylate is TC-110S manufactured by Nippon Kayaku Co., Ltd.; 1,6-hexanediol diacrylate is VISCOAT #230 manufactured by Osaka Organic Chemical Industry, Ltd.; polyethylene glycol diacrylate is a LIGHT ESTER 14EG-A manufactured by Kyoeisha Chemical Co., Ltd.; the antioxidant is IRGANOX 1035 manufactured by Ciba-Geigy; The photoinitiators are the same as used in examples 1–7 and A–G.

TEST EXAMPLES

The liquid curable resin compositions prepared in the above Examples and Comparative Examples were cured to produce test specimens by the method described for examples 1–7. The test specimens were evaluated according to the test methods described for examples 1–7, and further according to the test methods described below. The results are shown in Table 5.

5. Evaluation of Stability of Strength of Adhesion to Glass

The liquid curable resin composition was applied to a glass plate using a 100 μm thickness applicator bar to produce a coated film with a width of 1 cm. The film was cured by irradiation by UV light at a dose of 100 mJ/cm² in air. The strength of adhesion to glass was measured as the force to release the 1 cm wide film when the cured film was pulled at an angle of 90°. The test was carried out using a test specimen immediately after curing and a test specimen which was allowed to stand at 80° C. and RH of 95% for 30 days. The composition for which the adhesion strength changed 50% or more after having been allowed to stand for 30 days under conditions of 80° C. and 95% RH was judged to be unacceptable, and the composition for which the change in the adhesion strength was less than 50% was judged to be acceptable.

6. Capability of Multiple Coatings Being Removed Together

A glass fiber with an outer diameter of 125 μm was coated with the composition obtained in the Examples or Comparative Examples as a soft coating, and DESOLATE R3110 (a UV curable polyurethane acrylate resin manufactured by Japan Synthetic Rubber Co., Ltd.) as a secondary coating material, to produce a coated optical fiber with a secondary outer diameter of 250 mm. Four optical fibers thus prepared were bundled using DESOLATE R3059 (a UV curable polyurethane acrylate resin manufactured by Japan Synthetic Rubber Co., Ltd.) to produce an optical fiber ribbon with a thickness of 320 μm. The coating materials were removed from the four optical fiber ribbon in one operation using a hot stripper. Each glass fiber from which coating materials have been removed was observed by the naked eye. The optical fiber with a remarkable residue of a coating material on the surface was deemed to be unacceptable.

The results of the tests are shown in Table 5.

TABLE 5

| Experiment | Solubility[1] | Cure rate[2] | Color change after heating[3] | Adhesion stability to glass | Ease of removal | Overall evaluation |
|---|---|---|---|---|---|---|
| No. 8 | ○ | ○ | ○ | ○ | ○ | ○ |
| No. 9 | ○ | ○ | ○ | ○ | ○ | ○ |
| No. 10 | ○ | ○ | ○ | ○ | ○ | ○ |
| No. 11 | ○ | ○ | ○ | ○ | ○ | ○ |
| No. 12 | ○ | ○ | ○ | ○ | ○ | ○ |
| No. 13 | ○ | ○ | ○ | ○ | ○ | ○ |
| No. 14 | ○ | ○ | ○ | ○ | ○ | ○ |
| No. H | X | X | X | X | X | X |
| No. J | ○ | x | X | X | X | X |
| No. K | ○ | X | X | X | X | X |

[1]: The test specimens exhibiting a color change in the YI value within 5 times are deemed to be acceptable.
[2]: The resin with this ratio of 0.95 or greater was deemed to be acceptable.
[3]: Compositions containing undissolved solid components were judged to be unacceptable.
[4]: ○: acceptable
X: not acceptable.

As is clear from Table 5, the curable resin composition of the present invention exhibits a high cure rate and the cured products made from the composition exhibit a minimum change in color, and superior durability under high temperature conditions. In addition, the stability of adhesion of the cured film to glass was superb and yet the coated material can be removed with ease from optical fibers. Furthermore, each component used for preparing the resin composition of the present invention exhibits excellent solubility and the mixture of the components produces a homogeneous solution on stirring for three hours.

Example 15 and Comparison Experiments L–R

Radiation-curable coating compositions were prepared from pre-mixture ingredients as summarized in Table 6. Oligomer and monomer diluent were mixed as a master batch. The master batch was divided into 8 samples, and the photoinitiators and stabilizer (IRGANOX 1035) were added to each sample. The samples were mixed with a spatula and placed in an oven (88° C.) for 30 minutes. The samples were then shaken for 20 minutes, and the silane coupling agent (A-189) added and mixed by hand. The radiation-curable compositions were compared for color and clarity (before cure). Viscosity and cure speed measurements were also performed.

UV cure was executed at 1.0 J/cm² with a Fusion D lamp under a nitrogen atmosphere using film thickness of 3 mil.

TABLE 6

| Component (wt. %) | L | M | N | O | P | Q | R | 15 |
|---|---|---|---|---|---|---|---|---|
| polyether-based urethane acrylate oligomer | 84.9 | 83.7 | 83.7 | 83.7 | 83.7 | 83.7 | 83.7 | 83.7 |

TABLE 6-continued

| Component (wt. %) | L | M | N | O | P | Q | R | 15 |
|---|---|---|---|---|---|---|---|---|
| lauryl acrylate diluent | 6.04 | 6.0 | 6.0 | 6.0 | 6.0 | 6.0 | 6.0 | 6.0 |
| ethoxylated nonylphenol acrylate diluent | 6.04 | 6.0 | 6.0 | 6.0 | 6.0 | 6.0 | 6.0 | 6.0 |
| Lucirin TPO | 1.67 | — | — | — | — | — | — | — |
| Irgacure 184 | — | 3.0 | — | — | — | — | — | — |
| DEAP | — | — | 3.0 | — | — | — | — | — |
| Darocur 1173 | — | — | — | 3.0 | — | — | — | — |
| KIP 100F | — | — | — | — | 3.0 | — | — | — |
| Esacure KT046 | — | — | — | — | — | 3.0 | — | — |
| Irgacure 1700 | — | — | — | — | — | — | 3.0 | — |
| CGI-1900 | — | — | — | — | — | — | — | 3.0 |
| Irganox 1035 | 0.31 | 0.3 | 0.3 | 0.3 | 0.3 | 0.3 | 0.3 | 0.3 |
| mercapto propyl trimethoxy silane A-189 | 1.04 | 1.0 | 1.0 | 1.0 | 1.0 | 1.0 | 1.0 | 1.0 |
| clarity | clear | clear | clear | clear | clear | clear | clear | clear |
| color | colorless | colorless | colorless | colorless | colorless | colorless | yellow | yellow |
| viscosity mPas · s | 10,300 | 10,390 | 8,565 | 9,420 | 10,970 | 10,700 | 10,150 | 10,600 |
| particulate matter | yes | yes | yes | yes | yes | yes | no | no |

Photoinitiators were obtained from conventional suppliers. DEAP is diethoxyacetophenone. KIP 100F is an oligomeric Darocure 1173. Esacure KTO46 was obtained from Sartomer and is believed to comprise alkylated benzophenone (27 wt %), KIP 100F (27 wt. %), and Lucirin TPO (46 wt. %).

The results, which are described further below, surprisingly indicate that conventional photoinitiators do not provide the properties which are provided by the photoinitiator represented by formula (1).

The cured films were evaluated by optical microscopy and non-yellowing aging tests. Only the compositions of experiment R (comprising IRGACURE 1700) and from example 15 (comprising CGI 1900) showed no particulate matter.

However, additional non-yellowing tests showed that only the composition according to the present invention (example 15, comprising CGI 1900) displayed the requisite balance of properties. CGI 1900 comprises a mixture of the bisacylphosphine oxide photoinitiator according to formula (I) (25 wt. %) and Irgacure 184 (75 wt. %).

Comparison of Color Change

Color change measurements for experiment T and example 15 were carried out by conventional methods for cured samples. Delta E of the cured films was measured by conventional methods. Visual inspection was also used to estimate non-yellowing effects.

Yellowing measurements were carried out with film samples about 2×2 inches square. Color measurement data was obtained from a Macbeth Series 1500 Color Measurement System (Model 2020).

Figure 1:
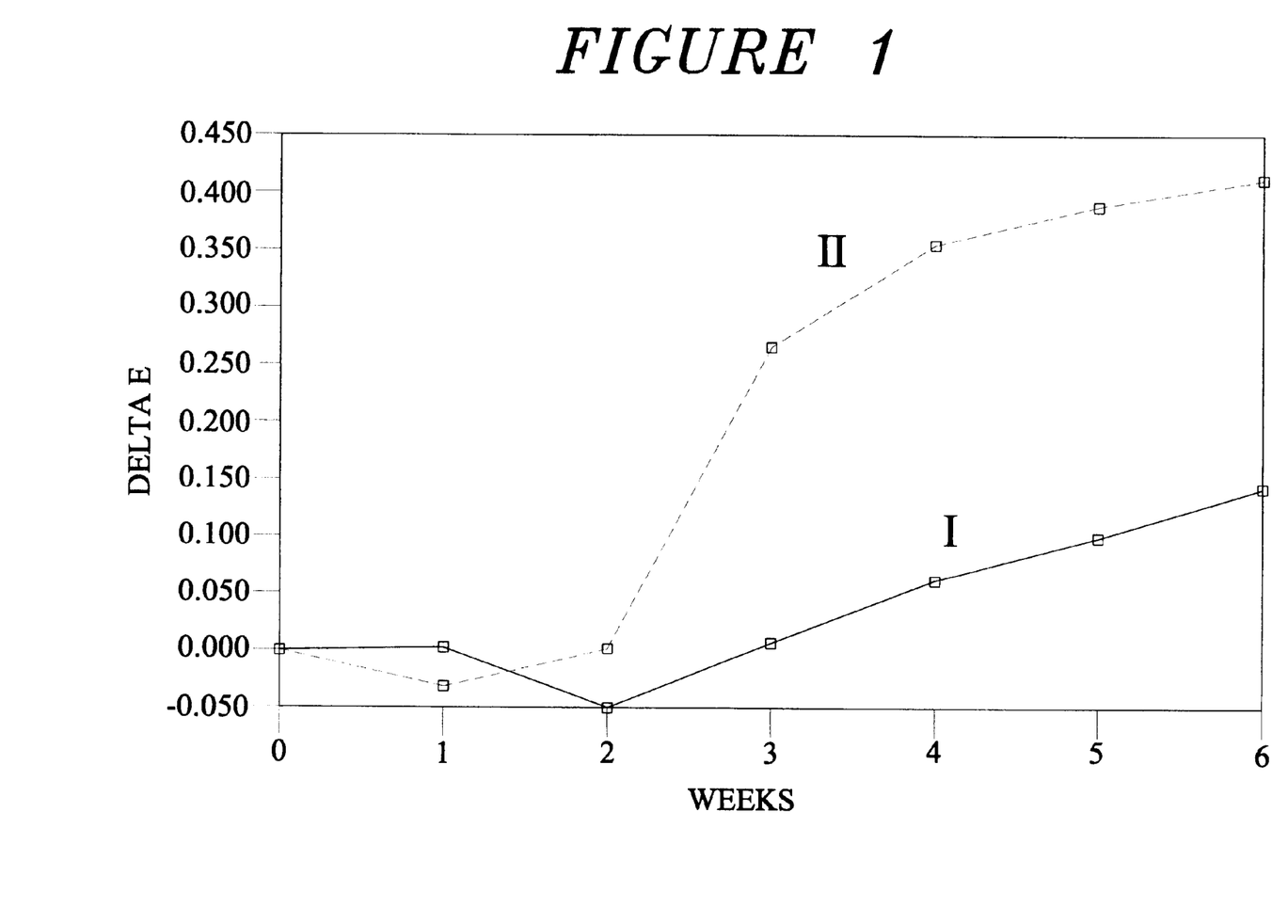
FIG. 1 illustrates comparative testing for color change for (1) cured coating compositions having photoinitiator according to the invention (sample I), versus (2) cured coating compositions having photoinitiator not according to the invention (sample II).

As shown in FIG. 1, when exposed to fluorescent light for a period of 6 weeks, cured composition Sample I (Example 15 of Table 6), which included a photoinitiator of Formula (1), showed substantially less yellowing than composition-Sample II (comparison experiment R of Table 6), which included photoinitiator IRG-1700.

Effect of the Invention

As is clear from the above experiments, the liquid curable resin composition of the present invention provides a material having features in which the curing speed is high, the durability of the cured product is excellent, and coloring caused by irradiation with light is reduced. When the liquid curable composition of the present invention is used as a coating material for coating wood, plastic sheet, optical fiber, or the like, the productivity increases because of its high curability and the improvement in durability of the coated material is expected.

The composition is in particular suitable for use as a material coated on optical fibers preferably glass fibers, because it exhibits stable adherence to glass fibers over a long time, and can be easily removed by one operation from the material on which the composition has been coated.

What is claimed is:

1. Radiation-curable composition for optical fiber coatings comprising, relative to the total composition, about 10 wt. % to about 90 wt. % of at least one radiation-curable oligomer (A), about 10 wt. % to about 90 wt. % of at least one radiation-curable monomer diluent (B), and an effective amount of at least one photoinitiator (C) represented by formula (1):

wherein $Ar^1$ to $Ar^3$ independently represent a substituted or unsubstituted aromatic group.

2. Composition according to claim 1, wherein the oligomer has a number average molecular weight of about 700–10,000.

3. Composition according to claim 1 wherein the radiation curable group in the oligomer is a (meth)acrylate group or a vinylether group.

4. Composition according to claim 1, wherein the oligomer comprises a backbone which is based on a polyether, polyester, polycarbonate, polyolefin or copolymers thereof.

5. Composition according to claim 1, wherein the reactive diluent has a molecular weight of not more than 550, or a viscosity at room temperature of not more than 300 mPa.s.

6. Composition according to claim 1, wherein the reactive diluent has an acrylate, vinylether, N-vinyl or acrylamide functionality.

7. Composition according to claim 1, wherein the photoinitiator (C) is present in an amount of 0.05–15 wt. %, relative to total composition.

8. Composition according to claim 1, wherein the groups represented by $Ar_1$, $Ar_2$ and $Ar_3$ are independently chosen from the group consisting of a phenyl group, methylphenyl group, ethylphenyl group, dimethylphenyl group, trimethylphenyl group, isopropylphenyl group, tert-butyl phenyl group, methoxy phenyl group, dimethoxyphenyl group, ethoxy phenyl group, diethoxy phenyl group, iso-propoxy phenyl group, thiomethoxy phenyl group, naphthyl group, thiophenyl group, and pyridyl group.

9. Composition according to claim 8, wherein the photo-initiator is bis-(2,4,6-trimethylbenzoyl)-phenylphosphine-oxide.

10. Composition according to claim 1, wherein the composition comprises at least one photoinitiator other than the photoinitiator according to formula 1.

11. A liquid curable resin composition for coating optical fibers comprising a photoinitiator represented by the following formula (1):

(1)

wherein $Ar^1$, $Ar^2$, and $Ar^3$ independently represent a substituted or unsubstituted aromatic group, wherein the ratio of gel content of the composition ($G_{10}/G_{100}$) as measured with methylethylketone extraction is 0.9 or higher, wherein $G_{100}$ represents the gel content of a coating cured at 100 mJ/cm$^2$, and $G_{10}$ represents the gel content of the composition of a coating cured at 10 mJ/cm$^2$.

12. A composition according to claim 11, wherein the cured coating exhibits a change in Yellowing Index by a heat resistance test of 7 days at 120° C. of less than 5.

13. A composition according to claim 11, wherein the ratio of gel content is 0.95 or higher.

14. A radiation-curable liquid resin composition for coating optical fibers comprising (a) 40–95% by weight of a polyurethane containing a polyoxyalkylene structure comprising at least one oxyalkylene group having 2–10 carbon atoms and an ethylenically unsaturated group, (b) 3–50% by weight of a mono-functional (meth)acrylate of which the homopolymer has a glass transition temperature of 20° C. or less, and (c) 0.05–10% by weight of a photo-initiator which is a compound having a chemical structure with the following formula (1), (1)

wherein $Ar^1$ to $Ar^3$ independently represent a substituted or unsubstituted aromatic group.

15. Inner primary coating for coating optical glass fiber being a composition according to claim 1.

16. Outer primary coatings, matrix materials, bundling materials or inks being a composition according to claim 1.

* * * * *